Sept. 23, 1952   R. LAPSLEY   2,611,452
TORQUE CONVERTER BRAKE CONSTRUCTION
Filed Aug. 3, 1948   3 Sheets-Sheet 1
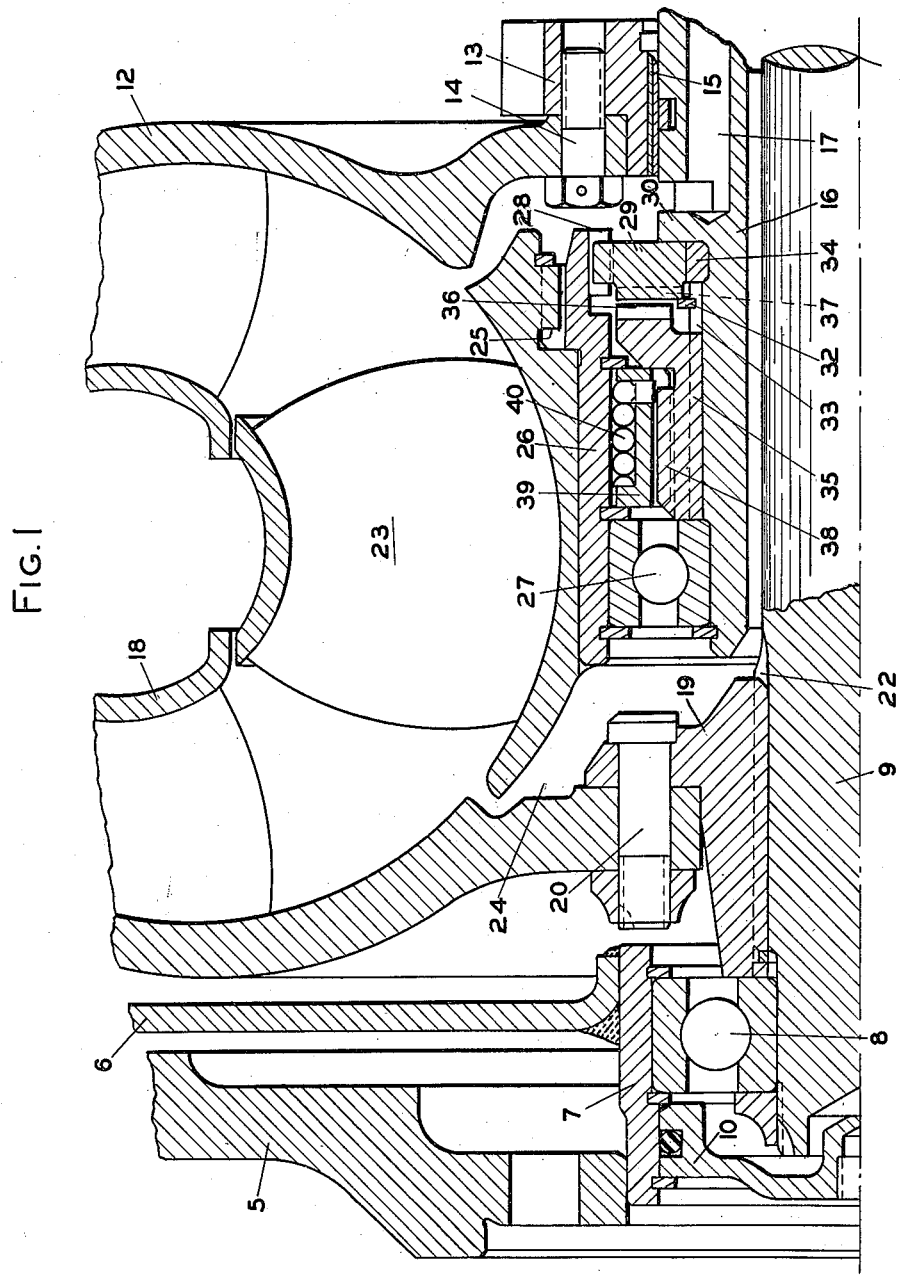
INVENTOR.
ROBERT LAPSLEY
BY Walter E. Schirmer
ATTY.

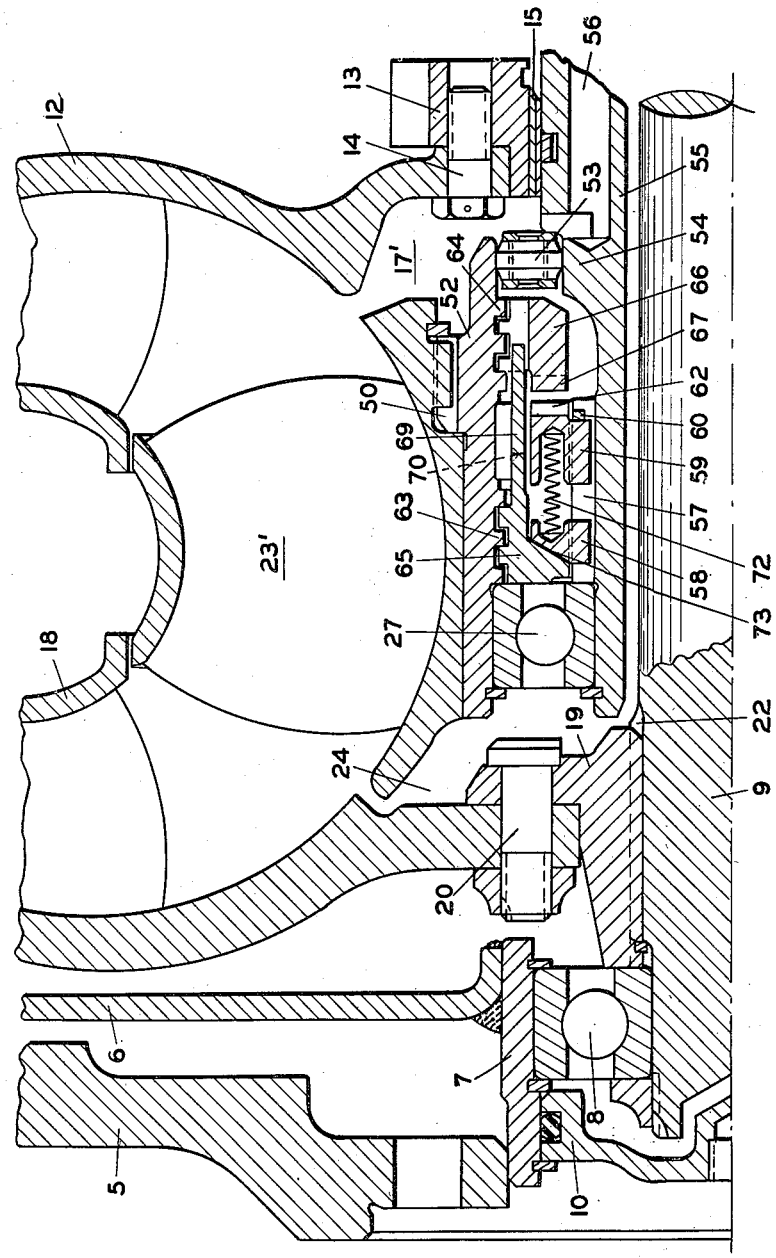

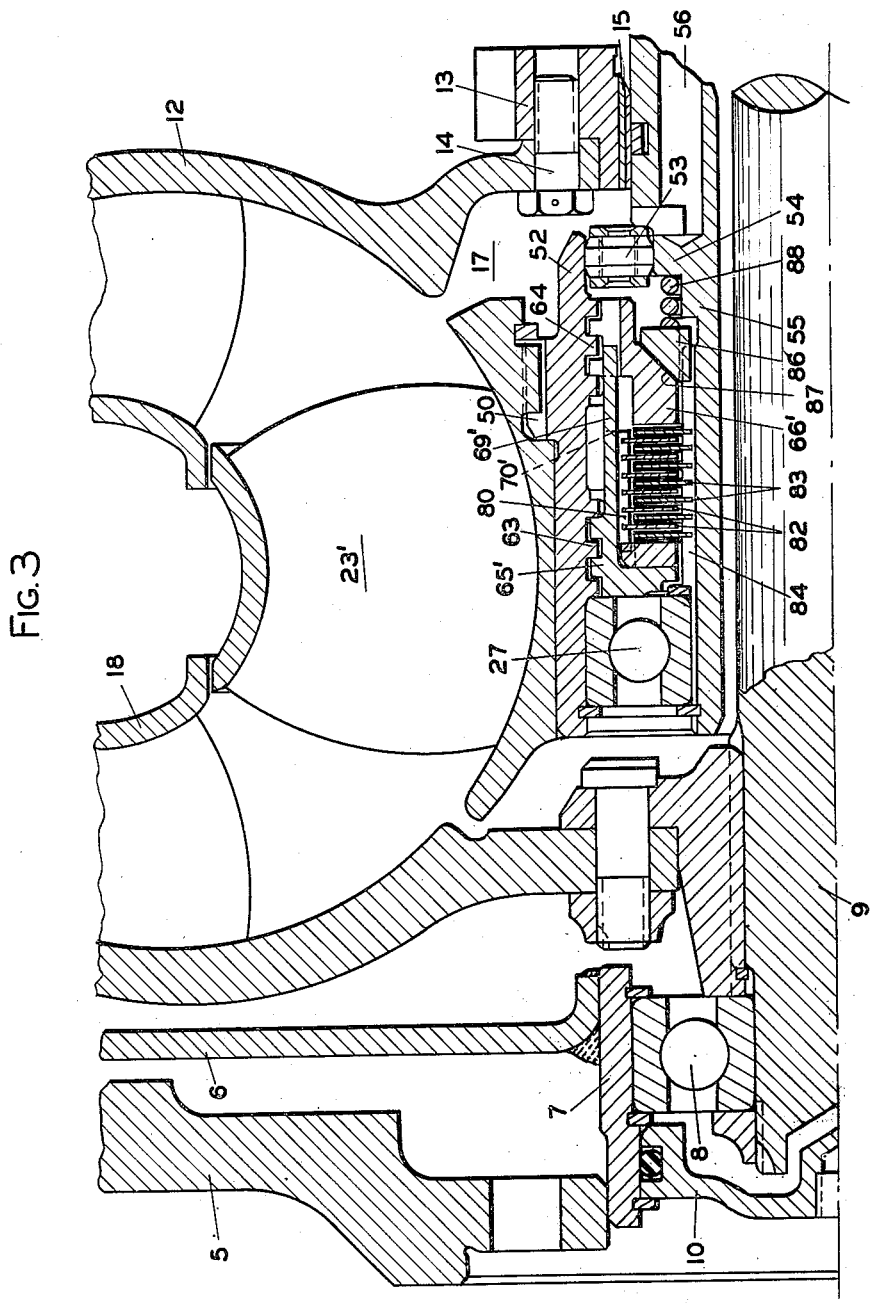

Patented Sept. 23, 1952

2,611,452

UNITED STATES PATENT OFFICE 2,611,452

TORQUE CONVERTER BRAKE CONSTRUCTION

Robert Lapsley, Berrien Springs, Mich., assignor to Clark Equipment Company, Buchanan, Mich., a corporation of Michigan Application August 3, 1948, Serial No. 42,258

4 Claims. (Cl. 188—82.6)

This invention relates to torque converter brake construction and more particularly is concerned with an overrunning brake construction for use in restraining the reaction member of a torque converter from reverse rotation in order that it may function properly to redirect the flow of fluid through the converter back to the pump element after the fluid leaves the turbine element.

The brake constructions embodied in the present invention provide for maintaining the reaction member against reverse rotation while allowing free forward rotation thereof, and primarily consist of actuating means controlled by the frictional drag when the converter tends to rotate in a reverse direction for threading a brake member into or out of braking engagement, depending upon the direction of stresses reacting against the blades of the stator or reaction member of the converter.

One of the primary objects of the present invention is to provide a brake construction of this type in which any tendency of the reaction member of the converter to rotate in a rearwardly direction with respect to the direction of rotation of the pump is counteracted by friction control means which threads or otherwise moves two braking elements relative to each other into braking engagement to prevent such reverse rotation, and which, upon the reaction member tending to rotate forwardly in the same direction as the pump member, releases the braking engagement to provide for free forward rotation.

While the invention is disclosed in several forms in the present application, the same underlying principles are involved in each of the forms, and in all embodiments of the invention, simplicity of design and positiveness of operation are secured.

Further objects and advantages of the invention will be more apparent when it is considered in connection with the accompanying drawings, which will disclose to those skilled in the art, particular constructions and operation of preferred embodiments of the invention.

Referring now in detail to the drawings,

Figure 1 is a sectional view through a portion of a torque converter disclosing the preferred form of brake construction.

Figure 2 is a corresponding sectional view of a modification of the brake construction shown in Figure 1; and Figure 3 is a similar view of a still further modified form of the invention.

Referring now in detail to Figure 1, there is provided an engine flywheel 5, to which is secured in any suitable manner, a housing member 6, rotatable conjointly with the flywheel 5, and having a bearing portion or sleeve 7, mounted upon the bearing assembly 8, journalled upon the driven shaft 9 of the converter. The end of this shaft is preferably closed by a suitable plate member 10, seated in the end of the hub 7, substantially co-planar with the flywheel 5. The housing member 6 is adapted to be joined peripherally to the pump element 12 of the converter, this pump element being of more or less conventional design, and carrying a hub portion 13, secured to the pump element through the studs 14, and being supported by bushings 15, upon a stationary sleeve member 16, secured against rotation in either direction and preferably having a passageway 17 therethrough for entry of oil into the converter, this oil preferably being forced into the passageway 17 from the discharge side of a fluid pump which may be driven by the gear portion of the hub 13 of the pump member 12.

The turbine or driven element 18 of the converter is provided with a hub member 19, secured thereto by means of the bolts 20, and having a splined internal portion engaged upon the splined portion 22 of the shaft 9.

Intermediate the pump element 12 and turbine element 18 is the stator or reaction member 23, there being the passageway 24 interposed therebetween for admitting fluid from the converter to the discharge around the shaft 9 within the stationary sleeve 16.

The reaction member 23 has spline connection, as indicated at 25, with a bushing member 26, which member at one end is adapted to receive the outer race of a bearing assembly 27, rotatably supporting the reaction member upon the sleeve 16. Adjacent the opposite end of the sleeve 26, there is provided internal teeth or splines 28, receiving the externally splined brake element 29, which is held against axial movement by the flange 30 of the sleeve 16 and the snap ring 32 mounted in the helical splines 33, formed on the external surface of the sleeve 16, between the flange 30 and the bearing assembly 27. Thus the member 29 rotates conjointly with the reaction member 23, having its periphery seated upon a bearing member or bushing 34, carried by the sleeve 16.

Mounted for axial sliding movement on the helical splines 33 of the sleeve is a second brake member 35, having radially directed ratchet teeth 36, disposed in position to engage the corresponding ratchet teeth 37 of the member 29. The member 35 has formed on its external surface, splined portions 38, which are engaged by corresponding splines of a spring controlled actuating member 39, mounted between suitably spaced snap rings in the interior of the sleeve 26.

The member 39 is adapted to carry an annular helically coiled spring 40, which spring has one end extending radially inwardly through a suitable opening in the member 39, thereby locking this spring in non-rotative position with respect to the member 39 and its free end coil in light frictional contact with the inner surface of bushing member 26.

In the operation of the brake construction, whenever the reaction member 23 tends to rotate rearwardly relative to the pump member 12, an expanding action is produced in the spring 40, causing it to increase frictionally its engagement against the inner surface of the sleeve 26. This locks the spring carrier 39 to sleeve 26 and any further reverse rotation causes the member 35 to be threaded to the right on the helical splines 33, as viewed in Figure 1, thereby moving its ratchet teeth 36 into engagement with the ratchet teeth of the member 37. Since the member 35 is locked against rotation relative the fixed sleeve 16, the engagement of ratchet teeth 36 and 37 produces a locking action preventing any further reverse rotation of the reaction member 23, and holding it in fixed position.

As the turbine member picks up speed, the discharge of oil therefrom hits upon the rear face of the reaction blades, causing the reaction member to tend to rotate forwardly. When this occurs, the forward thrust upon the sleeve member 26 causes a corresponding thrust on the spring member 40, and due to the helical spline connection of the member 35, causes a reverse threading action, threading the member 35 axially along the sleeve 16 to the left, thereby disengaging ratchet teeth 36 and 37 and freeing the reaction member 23 for forward rotation, so that the converter can function as a fluid coupling above a predetermined turbine speed.

The spring member 40 is of the type commonly known as an "LGS" spring clutch, and upon any tendency of the end thereof to rotate, the spring expanding thrust causes the coils of the spring to firmly grip the associated surface to provide a locked brake action therebetween. This frictional drag produced by the spring member thus causes the threading action producing relative movement between the brake elements 35 and 29, causing their engagement or disengagement, depending upon the rotative forces imposed on the reaction member 23.

In the form of the invention shown in Figure 2, the reaction member 23' is of a blade construction similar to that shown in Figure 1, but has a slightly different splined mounting 50, upon a sleeve element 52, which corresponds generally with the sleeve element 26, but carries at the end opposite the bearing assembly 27, a second bearing assembly 53, supporting the opposite end of the sleeve 52 upon the flange 54, of the stationary sleeve 55. This sleeve 55 is provided with the passageway 56, for introducing oil through the chamber 17' into the opening between the reaction member and the pump element 12.

The sleeve 55 is provided with external axial splines 57, upon which are mounted a pair of axially shiftable members 58 and 59, the member 59 being restrained against movement to the right by means of the snap ring 60, and also carrying ratchet teeth 62.

The inner surface of the sleeve member 52 is provided with helically threaded portions 63 and 64, respectively, which engage the correspondingly threaded elements 65 and 66, respectively, the element 66, in turn, carrying co-actuating ratchet teeth 67, alined with and engageable with the ratchet teeth 62 of the member 59. Each of the members 65 and 66 is provided with overlapping arm portions 69 and 70, respectively, which engage in suitable slotted openings in the members 65 and 66 to lock these members against relative rotation, thereby holding them in position for conjoint rotation, it being understood that the threaded portions 63 and 64 are reversed, whereby the members 65 and 66, when rotated relative to the bushing or sleeve 52, tend to move simultaneously toward each other or away from each other.

Disposed between the members 58 and 59 are a plurality of spring elements 72, normally tending to separate these members and thereby forcing the angular conical surface 73 of the member 58 to bear against a corresponding friction surface of the member 65.

In the operation of the brake construction, when the reaction member 23' tends to rotate in a direction reverse to that of the pump element 12, the spring 72, bearing against the member 58, holds the member 59 against the stop 60 by simultaneously exerting restraining action on the member 65, producing a frictional drag tending to thread this member to the right as viewed in Figure 2. This threading action of the member 65 to the right, causes axial movement of the member 58, thereby increasing the spring pressure and simultaneously producing a threading action of the member 66 to the left, since these two members are tied together through the arms 69 and 70, causing the members 65 and 66 to thread toward each other and to move ratchet teeth 67 of member 66 into engagement with ratchet teeth 62 of member 59. When this engagement occurs, the sleeve 52 and consequently the reaction member 23' are held against reverse rotation due to the locking action of the member 59, which is stationary upon the sleeve 55. Also, because of the relative movement toward each other of the members 65 and 66, the pressure of spring 72 is increased, thereby holding member 59 firmly against its stop during this rotation until such time as the locking action takes place.

When reaction member 23' tends to reverse its direction of rotation and rotate conjointly with the pump element 12, the threads 63 and 64 are so arranged as to produce by reason of the frictional drag at 73, a threading apart action, tending to separate the elements 65 and 66, and thereby automatically disengage ratchet teeth 62 and 67, thus releasing member 23 for forward rotation conjointly with the pump element 12.

Thus it will be seen that in this embodiment of the invention also, the frictional drag caused by reverse rotation actuates a suitable threading mechanism for moving one element of a ratchet brake into engagement with the other element thereof, to provide a locking action against reverse rotation of the reaction member.

In Figure 3, the same principle is disclosed with a slightly modified type of structure. The sleeve 52 is provided with the internal threaded portions 63 and 64, as previously described, adapted to receive the threading elements 65' and 66', having overlapping arm portions 69' and 70'. However, the member 65', in this form of the invention, has internal splines 80, carrying plate elements 82 which are alternated with plate elements 83, carried by the splines 84 of the sleeve member 55. These plate elements 83 carry friction surfaces thereon and are axially slidable upon the splines 84, while the plate members 82 are axially slidable upon the splines 80. Also mounted for axial sliding movement on the splines 84, is an actuator member 86, normally held in frictional engagement with the friction surface 87 of the member 66' by means of the coil spring 88. This produces a frictional drag between the members 66' and 86, whereby upon any tendency of the reaction member 23' to rotate in a reverse direction, produces a threading action of the element 66' relative the bushing 52, producing a corresponding threading action of element 65', these two elements thereby tending to move toward each other and thus compressing the plates 82 and 83 together, forming a multiple disc brake, the locking of the plates 82 and 83 together forming a positive lock from splines 84 to splines 80, thus locking the sleeve 52 and reaction member 23' together against reverse rotation relative the sleeve 55.

However, upon reversal of the forces on the reaction member 23' tending to cause this member to rotate forwardly with the pump element 12, the frictional drag in the opposite direction produces a threading apart of the elements 65' and 66', thereby releasing the frictional engagement between discs 82 and 83, and thus allowing forward rotation of the reaction member 23' conjointly with the member 12.

It will be apparent from an analysis of the various forms of the invention disclosed herein, that each of them basically contains a member subject to frictional reaction upon reverse rotation of the reaction member to produce a threading action of at least one element of a two-element ratchet brake, the other element of which is locked to one of the members, whereby a locking action is produced between these two elements to lock the stator against further reverse rotation.

Any forces tending to reverse the direction of rotation of the reaction member causes a release of this frictional drag, thereby producing a threading action releasing the ratchet engagement and providing for free forward rotation of the reaction member.

It will also be apparent that in all of the constructions disclosed, the arrangement is such as to include means for holding the reaction member against reverse rotation due to the threading action, but imposing opposite thrust forces upon one of the clutch members, thereby preventing any thrust being imposed upon the bearings of the reaction member.

I am aware that various changes may be made in certain of the details of the invention disclosed herein without in any way departing from the underlying principles thereof, and I therefore do not intend to be limited except as defined by the scope and spirit of the appended claims.

I claim:

1. In a torque converter including a stator having a hub, the combination of a fixed sleeve member projecting into the hub of the stator, said fixed sleeve member having external helical splines, bearing means journaling one end of the stator hub on said sleeve member, a first brake element secured within the other end of the stator hub and journaled on said sleeve member, a second brake element mounted on said helical splines within the confines of the stator hub for axial threaded movement toward and away from said first brake element, an axially fixed coil spring friction clutch disposed within the confines of the stator hub operable upon rotation of the stator in one direction to clutch said second brake element to the stator hub whereby said second brake element is threaded into clutching engagement with said first brake element.

2. In a torque converter including a stator having a hub, the combination of a fixed sleeve member projecting into the hub of the stator, said fixed sleeve member having external helical splines, bearing means journaling one end of the stator hub on said sleeve member, a first brake element secured within the other end of the stator hub and journaled on said sleeve member, a second brake element mounted on said helical splines within the confines of the stator hub for axial threaded movement toward and away from said first brake element, external splines formed on said second brake element, an axially fixed annular spring carrier having internal splines cooperating with said external splines on said second brake element, a coil spring friction clutch carried on the outer periphery of said spring carrier, and said coil spring friction clutch being operable upon rotation of the stator in one direction to clutch said spring carrier to the stator hub whereby said second brake element is caused to be threaded into clutching engagement with said first brake element.

3. The combination of claim 2 wherein said first and second brake elements are provided with co-operating ratchet teeth.

4. In a torque converter including a stator having a hub, the combination of a fixed sleeve member projecting into the hub of the stator, said fixed sleeve member having external helical splines, a bushing fixed in the stator hub and at one end having an internal splined portion, bearing means journaling the other end of said bushing on said sleeve member, a first brake element splined in the one end of said bushing and journaled on said sleeve member, said first brake element having ratchet teeth, a second brake element mounted on said helical splines within the confines of the stator hub for axial threaded movement toward and away from said first brake element, said second brake element having ratchet teeth adapted to cooperate with said ratchet teeth of said first brake element, external splines formed on said second brake element, an axially fixed annular spring carrier having internal splines cooperating with said external splines on said second brake element, a coil spring friction clutch carried on the outer periphery of said spring carrier, and said coil spring friction clutch being operable upon rotation of the stator in one direction to clutch said spring carrier to the stator hub whereby said second brake element is caused to be threaded into clutching engagement with said first brake element.

ROBERT LAPSLEY.

REFERENCES CITED

The following references are of record in the file of this patent:

UNITED STATES PATENTS

| Number | Name | Date |
|---|---|---|
| 1,862,188 | Legge | June 7, 1932 |
| 1,920,712 | Pilcher | Aug. 1, 1933 |
| 2,051,975 | Wemp | Aug. 25, 1936 |
| 2,062,930 | Pritchard | Dec. 1, 1936 |
| 2,068,869 | Rauen | Jan. 26, 1937 |
| 2,461,217 | Lapsley et al. | Feb. 8, 1949 |